(12) United States Patent
Cansizoglu et al.

(10) Patent No.: US 12,387,241 B2
(45) Date of Patent: *Aug. 12, 2025

(54) MEDIA PREVIEW SYSTEM

(71) Applicant: Snap Inc., Santa Monica, CA (US)

(72) Inventors: Omer Cansizoglu, Mercer Island, WA (US); Chang Li, Marina del Rey, CA (US); Brennan Erbeznik, Los Angeles, CA (US); Giovanni Gardelli, Los Angeles, CA (US); Ryan Hornberger, Playa Vista, CA (US); Jingou Xu, Marina del Rey, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/956,592

(22) Filed: Sep. 29, 2022

(65) Prior Publication Data
US 2023/0017029 A1  Jan. 19, 2023

Related U.S. Application Data

(63) Continuation of application No. 15/711,693, filed on Sep. 21, 2017, now Pat. No. 11,568,446.

(51) Int. Cl.
*G06Q 30/02* (2023.01)
*G06F 16/70* (2019.01)
*G06Q 30/0207* (2023.01)
*G06Q 30/0251* (2023.01)
*H04L 65/612* (2022.01)

(52) U.S. Cl.
CPC ......... *G06Q 30/0267* (2013.01); *G06F 16/70* (2019.01); *G06Q 30/0209* (2013.01); *H04L 65/612* (2022.05)

(58) Field of Classification Search
CPC ...................... G06Q 30/0267; G06Q 30/0209; G06F 16/70; H04L 65/612
See application file for complete search history.

(56) References Cited

U.S. PATENT DOCUMENTS

| 7,024,453 | B2 |   | 4/2006 | Stern et al. |
| 7,188,085 | B2 | * | 3/2007 | Pelletier ............. G06Q 30/0207 705/14.1 |
| 11,284,170 | B1 | * | 3/2022 | Singh ................... H04N 21/812 |
| 11,568,446 | B1 |   | 1/2023 | Cansizoglu et al. |

(Continued)

FOREIGN PATENT DOCUMENTS

CA          2854169 A1 * 12/2015  ............. G06Q 30/02

OTHER PUBLICATIONS

Benchoff, How to Put Your Logo in a QR Code, Aug. 11, 2011, https://hackaday.com/2011/08/11/how-to-put-your-logo-in-a-qr-code/comment-page-2/, pp. 1-16 (Year: 2011).*

(Continued)

*Primary Examiner* — John Van Bramer
(74) *Attorney, Agent, or Firm* — Schwegman Lundberg & Woessner, P.A.

(57) ABSTRACT

The media preview system receives media content from one or more client devices, generates a preview of the media content, associates a coded image with the preview within a database associated with the media preview system, detects scans of the coded image from client devices, and causes display of the preview at the client devices in response to detecting the scan.

20 Claims, 15 Drawing Sheets

(56) References Cited

U.S. PATENT DOCUMENTS

| | | | |
|---|---|---|---|
| 2008/0010351 A1 | 1/2008 | Wardhaugh et al. | |
| 2008/0235221 A1* | 9/2008 | Burns | G06F 21/6227 |
| 2011/0264527 A1 | 10/2011 | Fitzpatrick et al. | |
| 2012/0205436 A1 | 8/2012 | Thomas et al. | |
| 2014/0040001 A1* | 2/2014 | Harvey | G06Q 30/0222 |
| | | | 705/41 |
| 2014/0180790 A1 | 6/2014 | Boal | |
| 2015/0012426 A1 | 1/2015 | Purves et al. | |
| 2015/0039409 A1 | 2/2015 | Marsico et al. | |
| 2016/0149956 A1 | 5/2016 | Birnbaum et al. | |
| 2016/0255161 A1* | 9/2016 | Lim | G06Q 30/0207 |
| | | | 455/456.3 |

OTHER PUBLICATIONS

Lardinois, "Microsoft Gives up on Its Tag Barcode Service, Schedules It for Shutdown in 2015", Aug. 19, 2013, https://techcrunch.com/2013/08/19/microsoft-gives-up-on-its-tag-barcode-service-schedules-it-for-shutdown-in-2015/, pp. 1-3 (Year: 2013).*

"U.S. Appl. No. 15/711,693, Examiner Interview Summary mailed Jun. 5, 2019", 4 pgs.

"U.S. Appl. No. 15/711,693, Examiner Interview Summary mailed Oct. 22, 2019", 3 pgs.

"U.S. Appl. No. 15/711,693, Final Office Action mailed Jan. 19, 2022", 33 pgs.

"U.S. Appl. No. 15/711,693, Final Office Action mailed Jul. 24, 2020", 12 pgs.

"U.S. Appl. No. 15/711,693, Final Office Action mailed Aug. 9, 2019", 15 pgs.

"U.S. Appl. No. 15/711,693, Final Office Action mailed Dec. 9, 2020", 29 pgs.

"U.S. Appl. No. 15/711,693, Non Final Office Action mailed Mar. 5, 2020", 15 pgs.

"U.S. Appl. No. 15/711,693, Non Final Office Action mailed May 3, 2019", 14 pgs.

"U.S. Appl. No. 15/711,693, Non Final Office Action mailed Jun. 6, 2022", 28 pgs.

"U.S. Appl. No. 15/711,693, Non Final Office Action mailed Sep. 2, 2021", 30 pgs.

"U.S. Appl. No. 15/711,693, Non Final Office Action mailed Sep. 4, 2020", 13 pgs.

"U.S. Appl. No. 15/711,693, Notice of Allowance mailed Sep. 13, 2022", 10 pgs.

"U.S. Appl. No. 15/711,693, Response filed Mar. 29, 2021 to Final Office Action mailed Dec. 9, 2020".

"U.S. Appl. No. 15/711,693, Response filed Apr. 14, 2020 to Non Final Office Action mailed Mar. 5, 2020", 17 pgs.

"U.S. Appl. No. 15/711,693, Response filed Apr. 19, 2022 to Final Office Action mailed Jan. 19, 2022", 13 pgs.

"U.S. Appl. No. 15/711,693, Response filed Jun. 4, 2019 to Non Final Office Action mailed May 3, 2019", 16 pgs.

"U.S. Appl. No. 15/711,693, Response filed Jul. 8, 2022 to Non Final Office Action mailed Jun. 6, 2022", 13 pgs.

"U.S. Appl. No. 15/711,693, Response filed Aug. 5, 2020 to Final Office Action mailed Jul. 24, 2020", 11 pgs.

"U.S. Appl. No. 15/711,693, Response filed Sep. 16, 2020 to Non Final Office Action mailed Sep. 4, 2020", 11 pgs.

"U.S. Appl. No. 15/711,693, Response filed Oct. 20, 2021 to Non Final Office Action mailed Sep. 2, 2021", 13 pages.

"U.S. Appl. No. 15/711,693, Response filed Oct. 28, 2019 to Final Office Action mailed Aug. 9, 2019", 17 pgs.

* cited by examiner

MEDIA PREVIEW SYSTEM

CROSS-REFERENCE TO RELATED APPLICATION

This application is a continuation of U.S. patent application Ser. No. 15/711,693, filed Sep. 21, 2017, which is incorporated by reference herein in its entirety.

TECHNICAL FIELD

Embodiments of the present disclosure relate generally to mobile computing technology and, more particularly, but not by way of limitation, to systems for generating and presenting previews of media content at a client device.

BACKGROUND

Matrix barcodes, including for example QR codes, consist of squares arranged in grid patterns on white backgrounds, which can be read by an imaging device such as a camera, and processed using techniques such as Reed-Solomon error correction until the image may be interpreted. Data may then be extracted from the patterns that are present in both horizontal and vertical components of the image.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
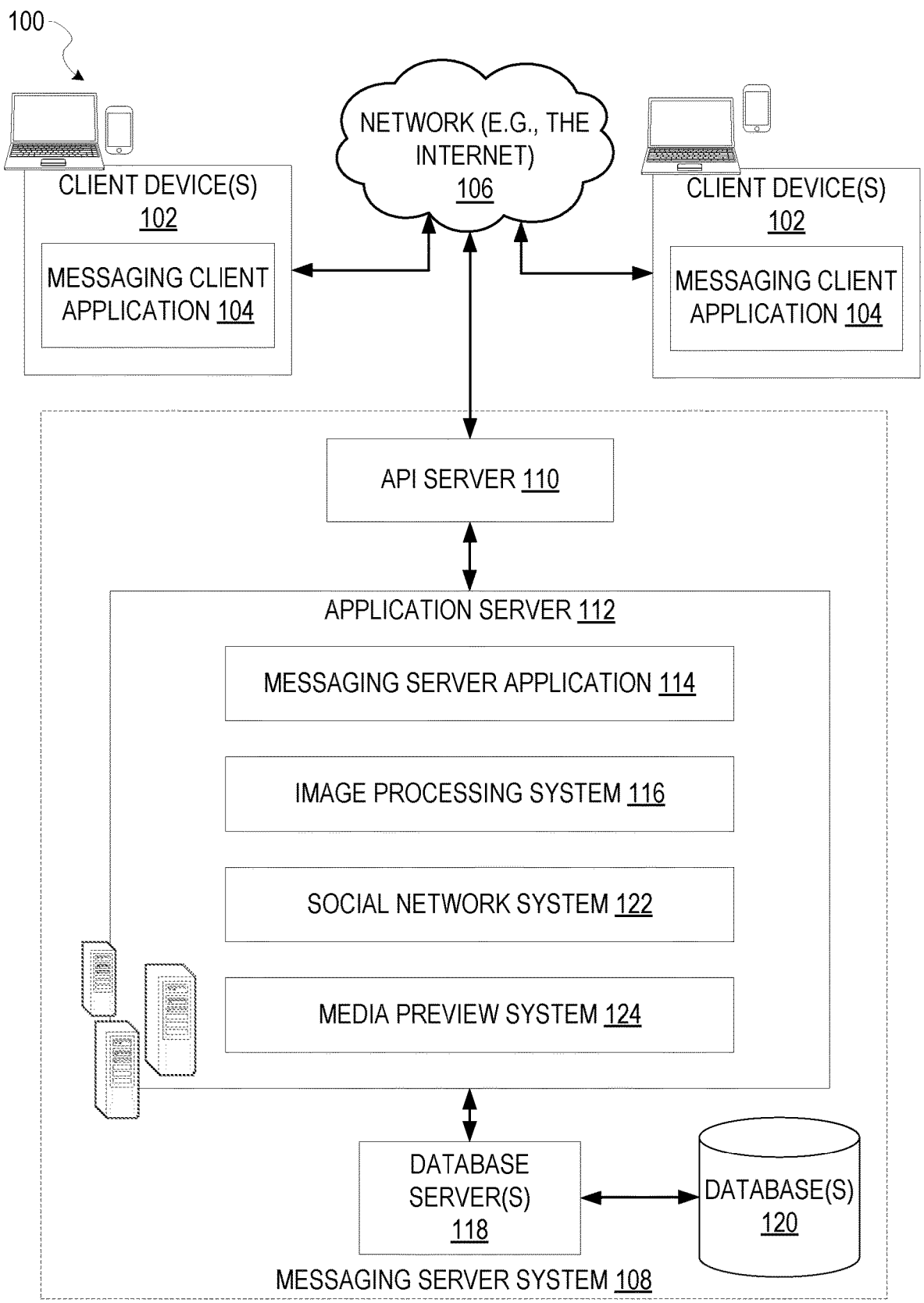
FIG. 1 is a block diagram showing an example messaging system for exchanging data (e.g., messages and associated content) over a network in accordance with some embodiments, wherein the messaging system includes a media preview system.

Embodiments of the present disclosure relate generally to mobile computing technology and, more particularly, but not by way of limitation, to systems for generating and presenting previews of media content at a client device.

It is uncommon for content creators to produce and release media content from a single draft-rather, the content creators will generally revise the media content in an iterative process through feedback received from a group of reviewers. To do so, the content creators share drafts of media content with reviewers through various means that may for example include email, hosting drafts of the media content at a webpage, or other similar distribution methods.

An issue with this process is that there is often no way of controlling who views the drafts of the media content, and further, that there is no simple way to control when and where a user may access and view the previews. For example, situations may arise wherein it may be favorable to keep drafts of media content confidential until time of release, due to changes which may be necessary. As a result, a system to enable controlled distribution of previews of media content, while allowing an administrative user the ability to alter or change the preview in real time, would prove to be an advantage.

In accordance with some embodiments described herein, a media preview system may be or include any instrumentality or aggregate of instrumentalities operable to compute, process, store, display, generate, communicate, or apply various forms of data for generating coded images to facilitate the display of previews of media content at client devices. The media preview system receives media content from one or more client devices, generates a preview of the media content, associates a coded image with the preview within a database associated with the media preview system, detects scans of the coded image from client devices, and causes display of the preview at the client devices in response to detecting the scan. Coded images may for example include optical barcodes, such as QR codes. In some example embodiments, the coded images may include custom or non-standard functional patterns that may provide an aesthetically pleasing branded barcode that allows for an exclusive experience associated with the optical barcode. For example, an entity logo can be used as a finder pattern, and in some instances an alignment pattern, that is machine-readable using specialized software discussed herein. Further details pertaining to coded images can be For example, the media content may include media content associated with a marketing or advertising campaign to be distributed through a network to a population of users. The media preview system generates a preview of the media content, wherein the preview of the media content depicts a representation of the media content before the media content has been distributed to the population of users. For example, the media preview system may modify the media content by applying a watermark, or graphical border to the media content.

In some example embodiments, the preview of the media content may include access parameters, wherein the access parameters define access conditions and restrictions to the preview of the media content. The access parameters may include predefined expiration events such as an expiration of an access timer or exceeding a request limit, or a combination of both. For example, in some embodiments, the media preview system may initiate an access timer in response to receiving an indication that a coded image has been scanned by a client device. The media preview system may thereby provide access to the preview of the media content in response to detecting scans of the coded image, until an expiration of the access timer. For example, the access timer may be configured to allow users to access the preview of the media content for a period of 24 hours from the first scan of the coded image. Upon determining that the access timer has expired, the media preview system may disassociate the preview with the coded image at the server, or may simply cause display of a graphical icon indicating that the coded image has expired.

In further embodiments, the media preview system may assign a request limit to the coded image, such that the preview of the media content may only be accessed by scanning the coded image a predefined number of times (e.g., 50 scans). In such embodiments, the media preview system may increment a counter in response to detecting a scan of the coded image. Upon determining that a count of the scans of the coded image exceeds a threshold defined by a request limit, the media preview system may deny access to the preview. For example, the media preview system may disassociate the coded image from the preview at the server, or simply cause display of a notification at the client device, wherein the notification includes an indication that the request limit has been exceeded.

In some example embodiments, upon detecting an expiration event, the media preview system may disassociate the preview of the media content from the coded image at the server, generate a new coded image, associate the new coded image with the preview of the media content at the server, and notify an administrator associated with the media content of the new coded image, so that the administrator may distribute the new coded image.

A media preview system may also, in some embodiments, associate multiple preview of media content with a single coded image. Upon detecting a scan of the coded image, the media preview system may generate and cause display of a preview library at the requesting device, wherein the preview library includes a presentation of each preview. A user of the requesting device may thereby select a preview from among the presentation within the preview library, and in response, the media preview system may cause display of the preview at the requesting device.

The media preview system may, in one implementation, receive media content as submissions from one or more client devices, wherein the media content includes drafts of advertising media. Upon receiving the media content, the media preview system generates a preview of the media content, wherein the preview includes a presentation of the media content and a set of access parameters, wherein the access parameters define a duration of time, as well as a population of users, which may view the preview of the media content. The media preview system may additional alter the media content by including a watermark, or other graphical element. Having generated the preview of the media content, the media preview system assigns a coded image, like a QR code, to the preview within a database, such that reference to the coded image causes the media preview system to retrieve the preview. The media preview system may share the coded image with a user, wherein the user may distribute or share the coded image as they please. For example, the user may forward the coded image to one or more reviewing users, who may access the preview by scanning the coded image with an enabled device. The user may then make changes or adjustments to the media content and the preview of the media content at the server side, and as reviewers scan to access the preview, the most recent preview of the media content may be presented.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. In some embodiments, this data includes, message content, client device information, geolocation information, media annotation and overlays, message content persistence conditions, social network information, and live event information, as examples. In other embodiments, other data is used. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the Application Program Interface (API) server 110, this server receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, opening and application event (e.g., relating to the messaging client application 104).

The application server 112 hosts a number of applications and subsystems, including a messaging server application 114, an image processing system 116, a social network system 122, and a media preview system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions services, and makes these functions and services available to the messaging server application 114. To this end, the social network system 122 maintains and accesses an entity graph 304 within the database 120. Examples of functions and services supported by the social network system 122 include the identification of other users of the messaging system 100 with which a particular user has relationships or is "following," and also the identification of other entities and interests of a particular user.

The application server 112 is communicatively coupled to a database server 118, which facilitates access to a database 120 in which is stored data associated with messages processed by the messaging server application 114.

Figure 2:
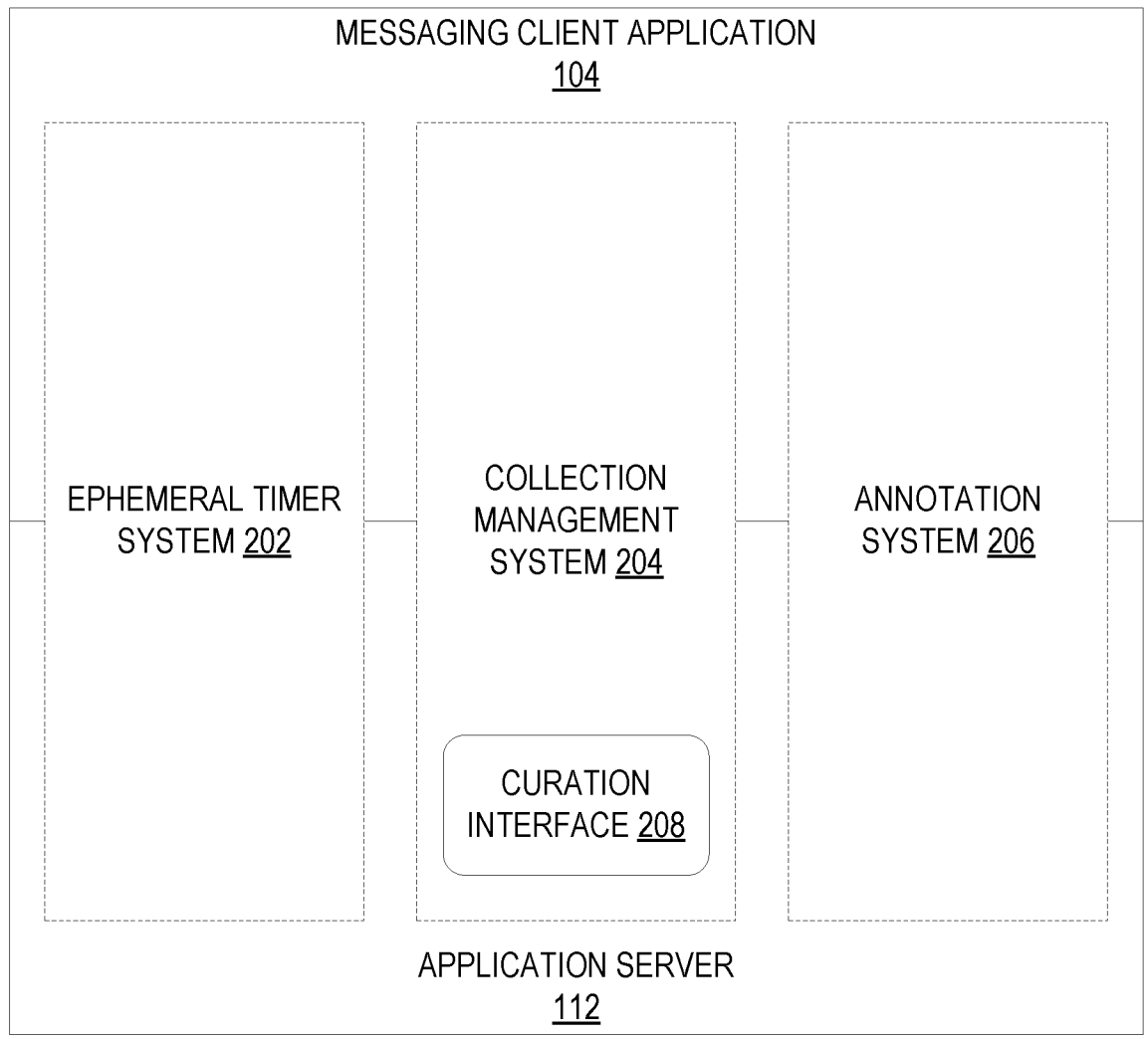
FIG. 2 is block diagram illustrating further details regarding a messaging system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, collection of messages (e.g., a SNAPCHAT story), or graphical element, selectively display and enable access to messages and associated content via the messaging client application 104. Further details regarding the operation of the ephemeral timer system 202 are provided below.

The collection management system 204 is responsible for managing collections of media (e.g., collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a SNAPCHAT filter) to the messaging client application 104 based on a geolocation of the client device 102. In another example, the annotation system 206 operatively supplies a media overlay to the messaging client application 104 based on other information, such as, social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay including text that can be overlaid on top of a photograph generated taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

Figure 3:
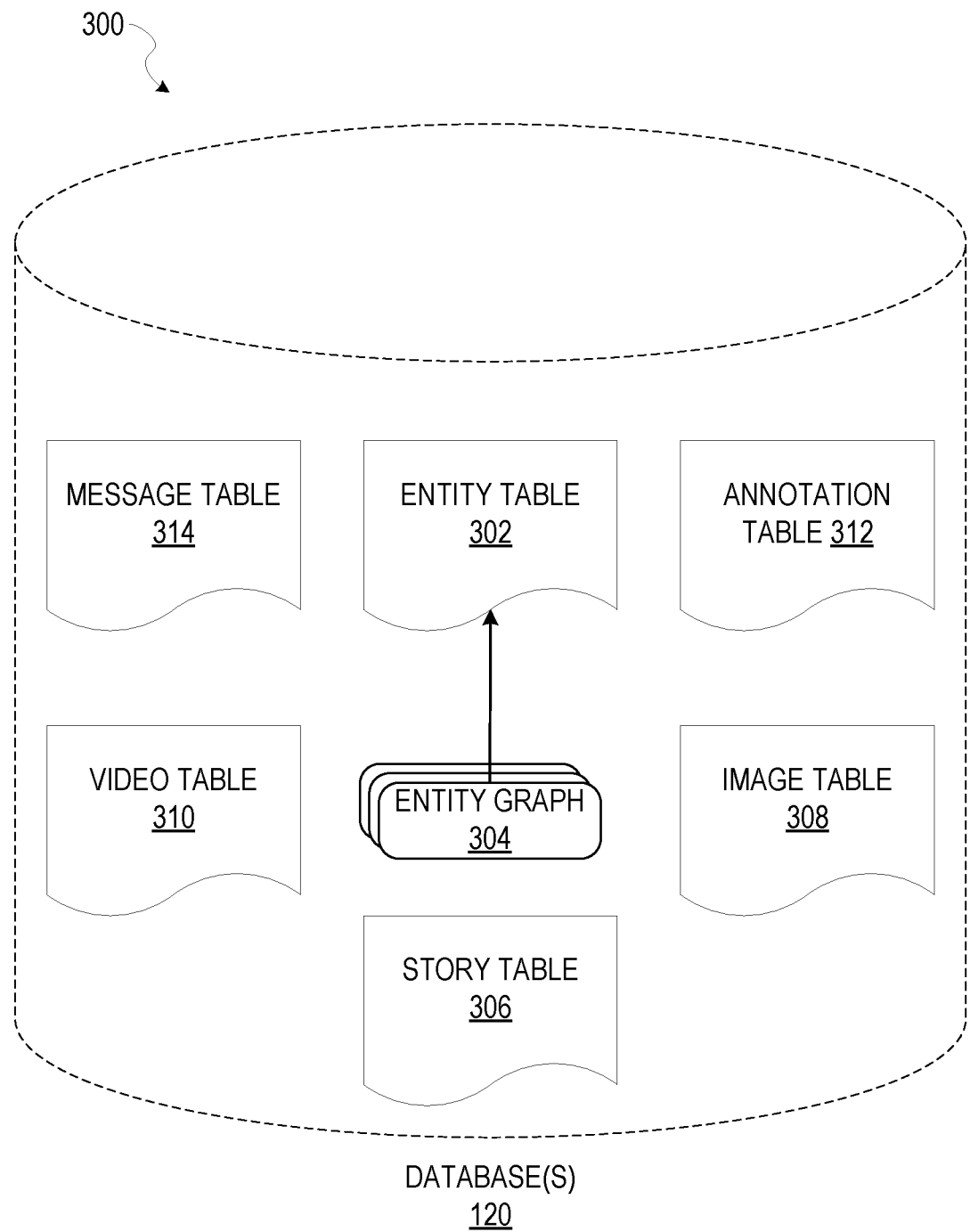
FIG. 3 is a schematic diagram illustrating data which may be stored in the database of the messaging server system, according to certain example embodiments.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time FIG. 3 is a schematic diagram 300 illustrating data 300 which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 314. The entity table 302 stores entity data, including an entity graph 304. Entities for which records are maintained within the entity table 302 may include individuals, corporate entities, organizations, objects, places, events etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization) interested-based or activity-based, merely for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of varies types, including a user-selected filters from a gallery of filters presented to a sending user by the messaging client application 104 when the sending user is composing a message. Other types of filers include geolocation filters (also known as geo-filters) which may be presented to a sending user based on geographic location. For example, geolocation filters specific to a neighborhood or special location may be presented within a user interface by the messaging client application 104, based on geolocation information determined by a GPS unit of the client device 102. Another type of filer is a data filer, which may be selectively presented to a sending user by the messaging client application 104, based on other inputs or information gathered by the client device 102 during the message creation process. Example of data filters include current temperature at a specific location, a current speed at which a sending user is traveling, battery life for a client device 102 or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video or audio data, which are compiled into a collection (e.g., a SNAPCHAT story or a gallery). The creation of a particular collection may be initiated by a particular user (e.g., each user for which a record is maintained in the entity table 302) A user may create a "personal story" in the form of a collection of content that has been created and sent/broadcast by that user. To this end, the user interface of the messaging client application 104 may include an icon that is user selectable to enable a sending user to add specific content to his or her personal story.

A collection may also constitute a "live story," which is a collection of content from multiple users that is created manually, automatically or using a combination of manual and automatic techniques. For example, a "live story" may constitute a curated stream of user-submitted content from varies locations and events. Users, whose client devices have location services enabled and are at a common location event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story", which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
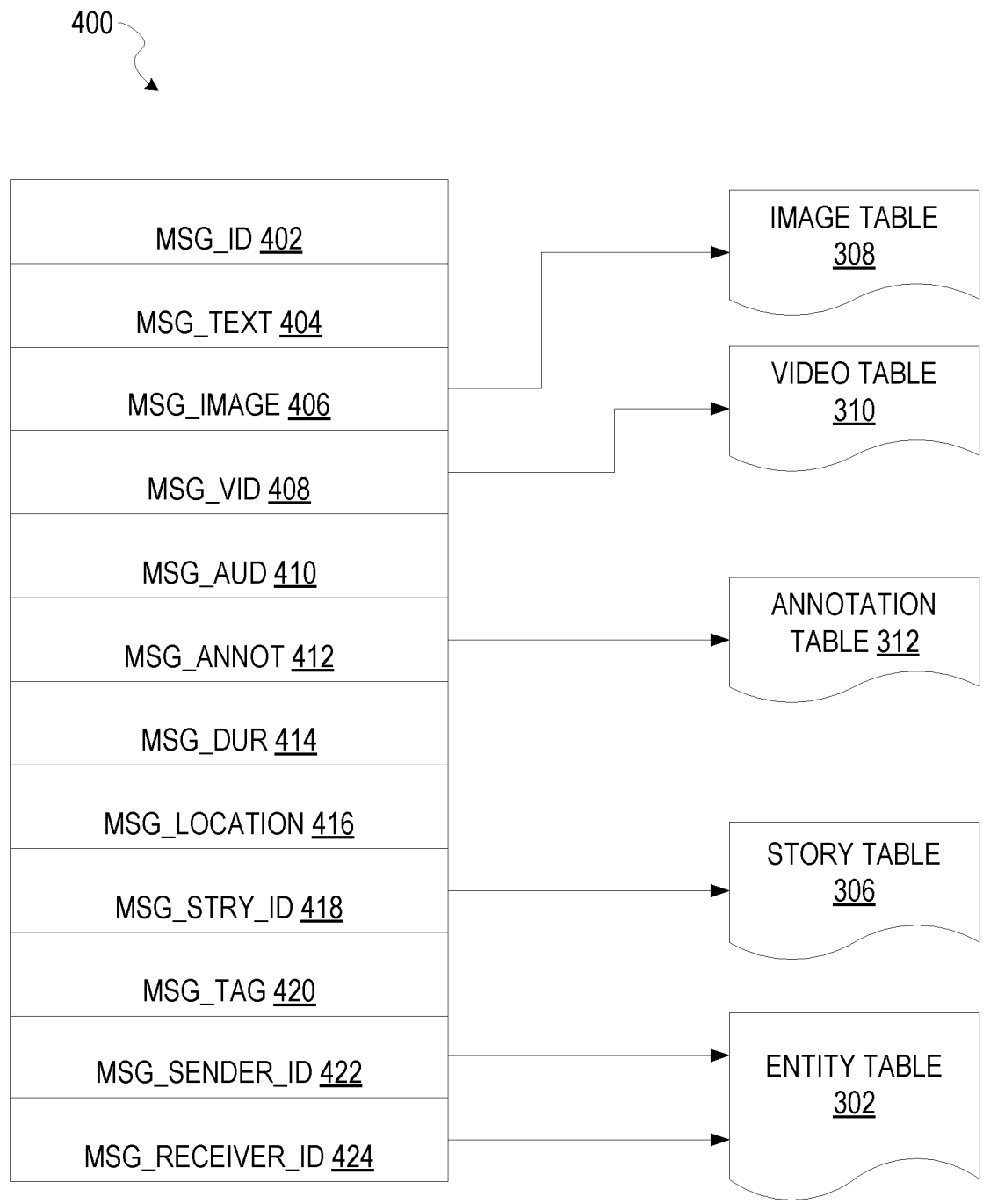
FIG. 4 is a schematic diagram illustrating a structure of a message, according to some embodiments, generated by a messaging client application for communication.

FIG. 4 is a schematic diagram illustrating a structure of a message 400, according to some in some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "inflight" data of the client device 102 or the application server 112. The message 400 is shown to include the following components:

- A message identifier 402: a unique identifier that identifies the message 400.
- A message text payload 404: text, to be generated by a user via a user interface of the client device 102 and that is included in the message 400.
- A message image payload 406: image data, captured by a camera component of a client device 102 or retrieved from memory of a client device 102, and that is included in the message 400.
- A message video payload 408: video data, captured by a camera component or retrieved from a memory component of the client device 102 and that is included in the message 400.
- A message audio payload 410: audio data, captured by a microphone or retrieved from the memory component of the client device 102, and that is included in the message 400.
- A message annotations 412: annotation data (e.g., filters, stickers or other enhancements) that represents annotations to be applied to message image payload 406, message video payload 408, or message audio payload 410 of the message 400.
- A message duration parameter 414: parameter value indicating, in seconds, the amount of time for which content of the message (e.g., the message image payload 406, message video payload 408, message audio payload 410) is to be presented or made accessible to a user via the messaging client application 104
- A message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).
- A message story identifier 418: identifier values identifying one or more content collections (e.g., "stories") with which a particular content item in the message image payload 406 of the message 400 is associated. For example, multiple images within the message image payload 406 may each be associated with multiple content collections using identifier values.
- A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- A message sender identifier 422: an identifier (e.g., a messaging system identifier, email address or device identifier) indicative of a user of the client device 102 on which the message 400 was generated and from which the message 400 was sent
- A message receiver identifier 424: an identifier (e.g., a messaging system identifier, email address or device identifier) indicative of a user of the client device 102 to which the message 400 is addressed.

The contents (e.g. values) of the various components of message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an entity table 302.

Figure 5:
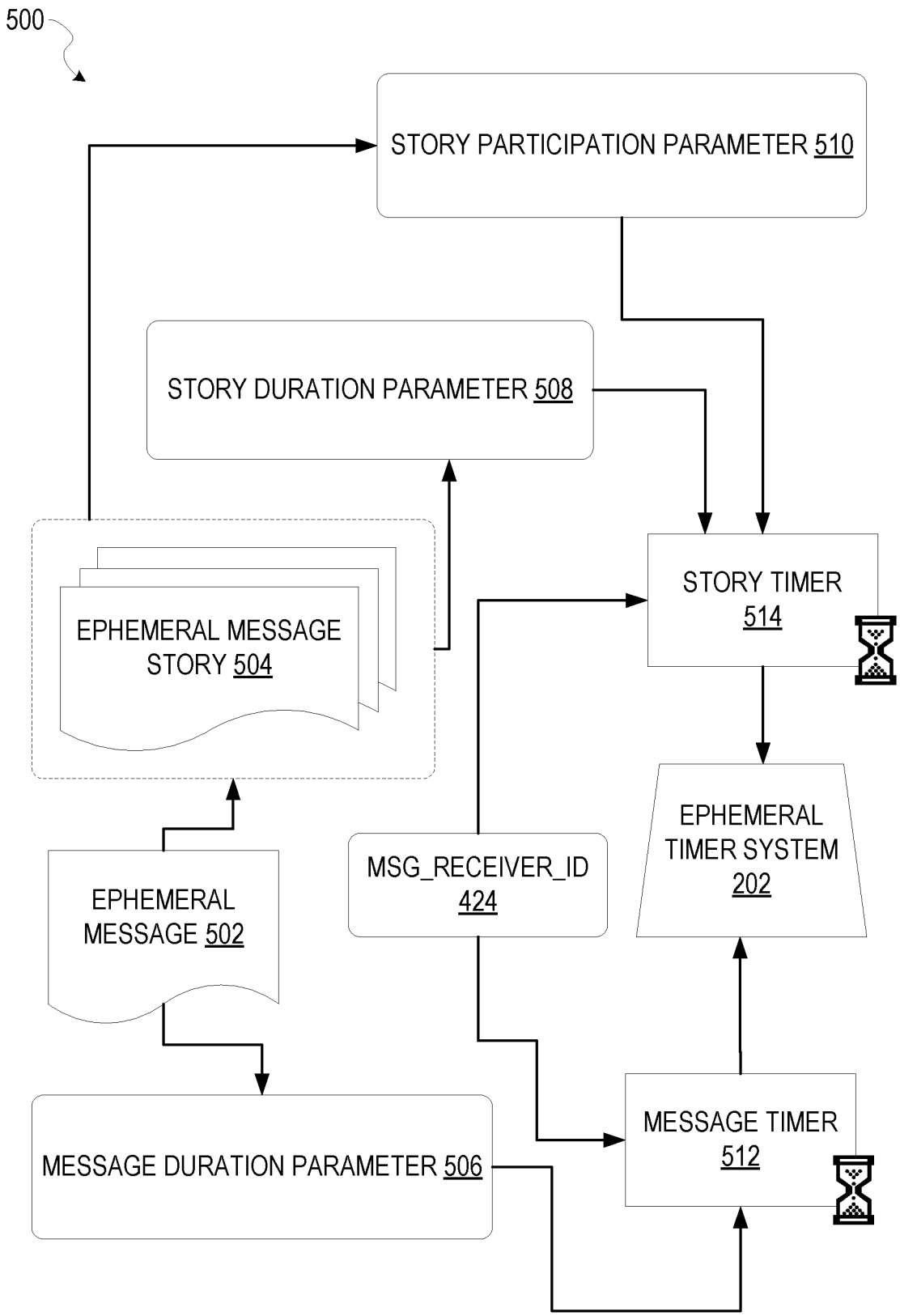
FIG. 5 is a schematic diagram illustrating an example access-limiting process, in terms of which access to content (e.g., an ephemeral message, and associated multimedia payload of data) or a content collection (e.g., an ephemeral message story) may be time-limited (e.g., made ephemeral) in accordance with some embodiments.

FIG. 5 is a schematic diagram illustrating an access-limiting process 500, in terms of which access to content (e.g., an ephemeral message 502, and associated multimedia payload of data) or a content collection (e.g., an ephemeral message story 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, where the messaging client application 104 is a SNAPCHAT application client, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message story 504 (e.g., a personal SNAPCHAT story, or an event story). The ephemeral message story 504 has an associated story duration parameter 508, a value of which determines a time-duration for which the ephemeral message story 504 is presented and accessible to users of the messaging system 100. The story duration parameter 508, for example, may be the duration of a music concert, where the ephemeral message story 504 is a collection of content pertaining to that concert. Alternatively, a user (either the owning user or a curator user) may specify the value for the story duration parameter 508 when performing the setup and creation of the ephemeral message story 504.

Additionally, each ephemeral message 502 within the ephemeral message story 504 has an associated story participation parameter 510, a value of which determines the duration of time for which the ephemeral message 502 will be accessible within the context of the ephemeral message story 504. Accordingly, a particular ephemeral message story 504 may "expire" and become inaccessible within the context of the ephemeral message story 504, prior to the ephemeral message story 504 itself expiring in terms of the story duration parameter 508. The story duration parameter 508, story participation parameter 510, and message receiver identifier 424 each provide input to a story timer 514, which operationally determines, firstly, whether a particular ephemeral message 502 of the ephemeral message story 504 will be displayed to a particular receiving user and, if so, for how long. Note that the ephemeral message story 504 is also aware of the identity of the particular receiving user as a result of the message receiver identifier 424.

Accordingly, the story timer 514 operationally controls the overall lifespan of an associated ephemeral message story 504, as well as an individual ephemeral message 502 included in the ephemeral message story 504. In one embodiment, each and every ephemeral message 502 within the ephemeral message story 504 remains viewable and accessible for a time-period specified by the story duration parameter 508. In a further embodiment, a certain ephemeral message 502 may expire, within the context of ephemeral message story 504, based on a story participation parameter 510. Note that a message duration parameter 506 may still determine the duration of time for which a particular ephemeral message 502 is displayed to a receiving user, even within the context of the ephemeral message story 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message story 504.

The ephemeral timer system 202 may furthermore operationally remove a particular ephemeral message 502 from the ephemeral message story 504 based on a determination that it has exceeded an associated story participation parameter 510. For example, when a sending user has established a story participation parameter 510 of 24 hours from posting, the ephemeral timer system 202 will remove the relevant ephemeral message 502 from the ephemeral message story 504 after the specified 24 hours. The ephemeral timer system 202 also operates to remove an ephemeral message story 504 either when the story participation parameter 510 for each and every ephemeral message 502 within the ephemeral message story 504 has expired, or when the ephemeral message story 504 itself has expired in terms of the story duration parameter 508.

In certain use cases, a creator of a particular ephemeral message story 504 may specify an indefinite story duration parameter 508. In this case, the expiration of the story participation parameter 510 for the last remaining ephemeral message 502 within the ephemeral message story 504 will determine when the ephemeral message story 504 itself expires. In this case, a new ephemeral message 502, added to the ephemeral message story 504, with a new story participation parameter 510, effectively extends the life of an ephemeral message story 504 to equal the value of the story participation parameter 510.

Responsive to the ephemeral timer system 202 determining that an ephemeral message story 504 has expired (e.g., is no longer accessible), the ephemeral timer system 202 communicates with the messaging system 100 (and, for example, specifically the messaging client application 104 to cause an indicium (e.g., an icon) associated with the relevant ephemeral message story 504 to no longer be displayed within a user interface of the messaging client application 104. Similarly, when the ephemeral timer system 202 determines that the message duration parameter 506 for a particular ephemeral message 502 has expired, the ephemeral timer system 202 causes the messaging client application 104 to no longer display an indicium (e.g., an icon or textual identification) associated with the ephemeral message 502.

Figure 6:
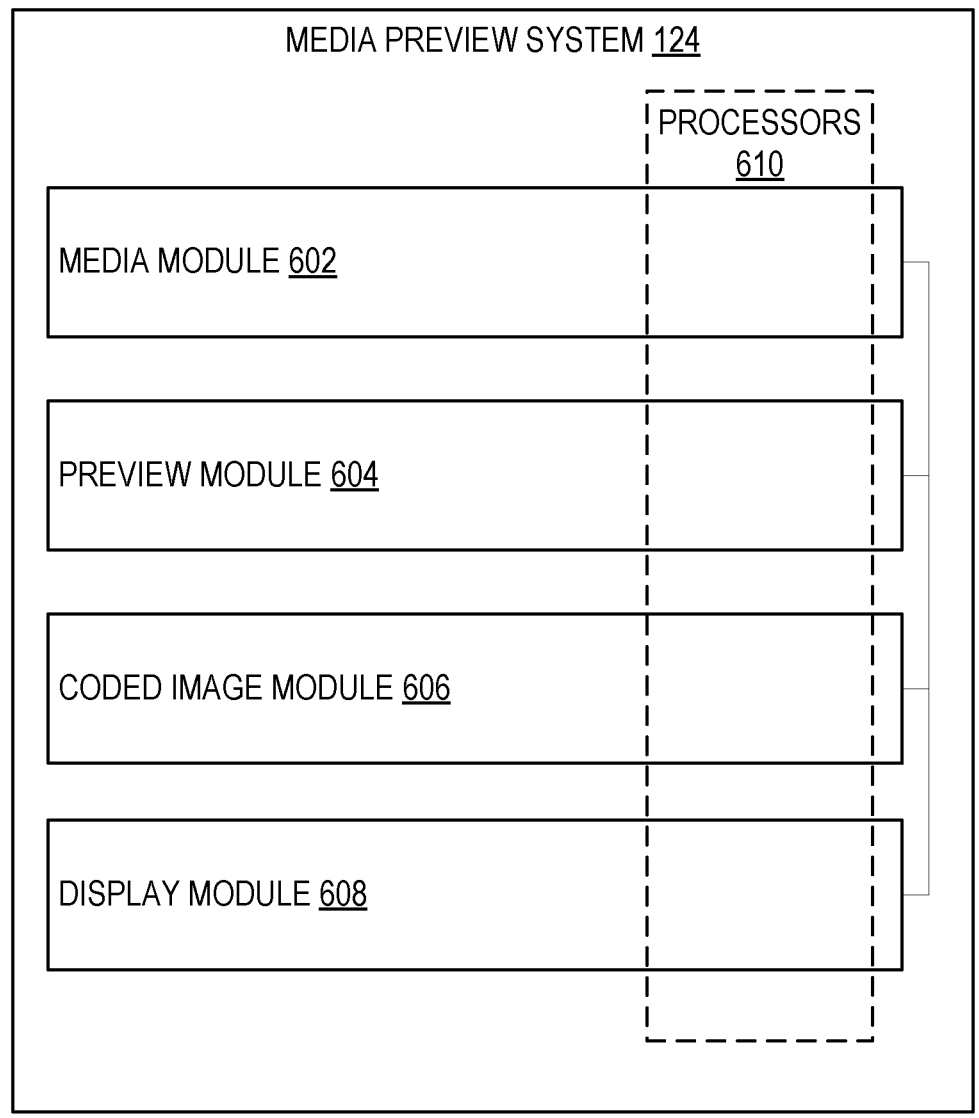
FIG. 6 is a block diagram illustrating various modules of a media preview system, according to certain example embodiments.

FIG. 6 is a block diagram illustrating components of the media preview system 124, that configure the media preview system 124 to receive media content at a server, generate a preview of the media content, associate a coded image with the preview, receive a scan of the coded image, and cause display of the preview, according to some example embodiments. The media preview system 124 is shown as including a media module 602, a preview module 604, a coded image module 606, and a display module 608, all configured to communicate with each other (e.g., via a bus, shared memory, or a switch). Any one or more of these modules may be implemented using one or more processors 610 (e.g., by configuring such one or more processors to perform functions described for that module) and hence may include one or more of the processors 610.

Any one or more of the modules described may be implemented using hardware alone (e.g., one or more of the processors 610 of a machine) or a combination of hardware and software. For example, any module described of the media preview system 124 may physically include an arrangement of one or more of the processors 610 (e.g., a subset of or among the one or more processors of the machine) configured to perform the operations described herein for that module. As another example, any module of the media preview system 124 may include software, hardware, or both, that configure an arrangement of one or more processors 610 (e.g., among the one or more processors of the machine) to perform the operations described herein for that module. Accordingly, different modules of the media preview system 124 may include and configure different arrangements of such processors 610 or a single arrangement of such processors 610 at different points in time. Moreover, any two or more modules of the media preview system 124 may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 7A:
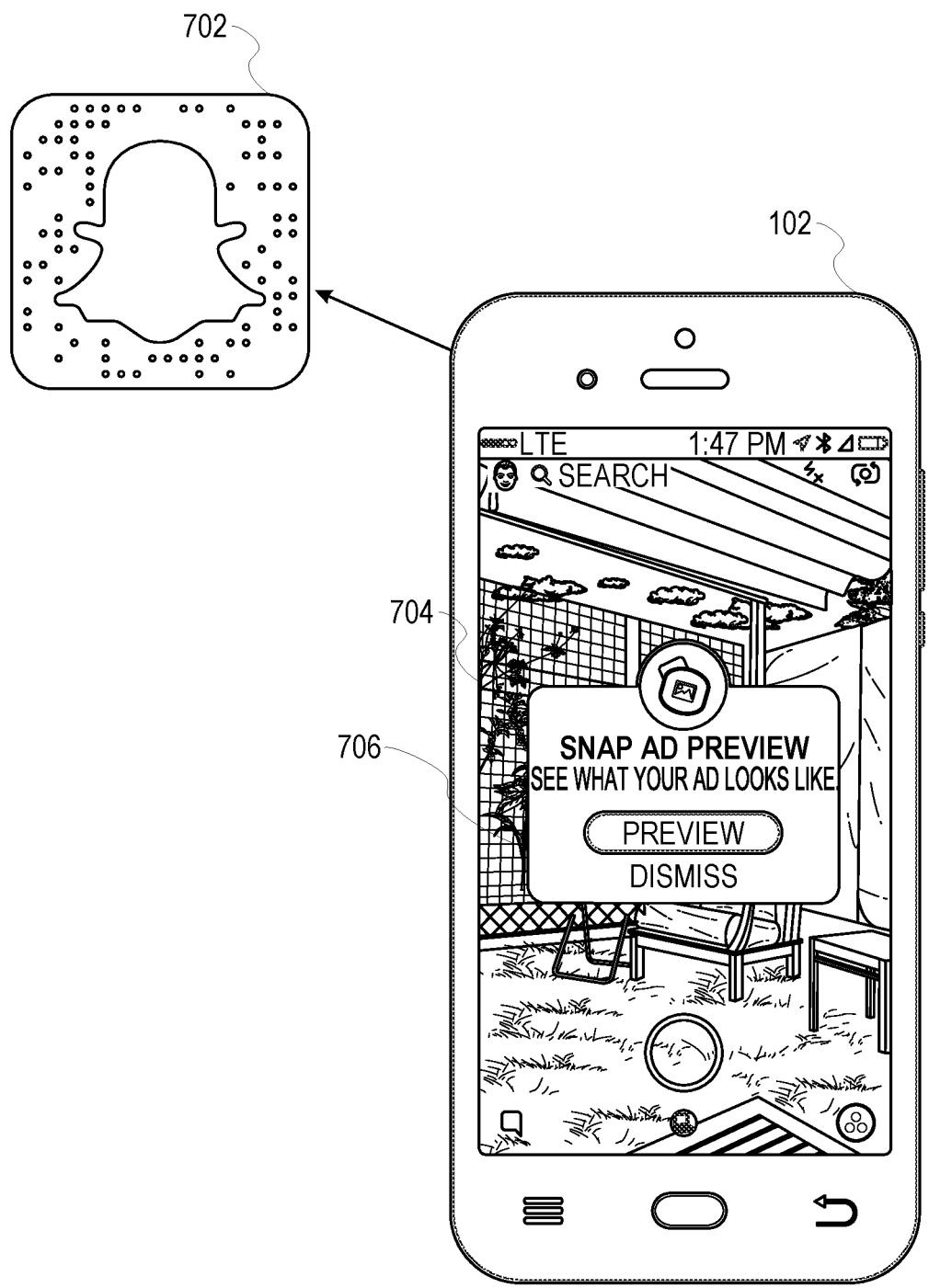
FIG. 7A includes a depiction of a coded image and a presentation of a preview of media content at a client device, according to certain example embodiments.

FIG. 7A includes a depiction of a coded image 702 and a presentation of a preview 704 of media content at a client device 102, according to certain example embodiments. As seen in FIG. 7, the client device 102 may be used to capture/scan the coded image 702. The coded image module 606 of the media preview system 124 may detect the scan of the coded image 602 by the client device 102, and in response, the display module 608 may retrieve a preview associated with the coded image 602 within a database of a server (e.g., the preview 704). In some example embodiments, the preview 704 may include a watermark.

FIG. 7 also includes a notification 706. In some example embodiments, the display module 608 may cause display of the notification 706 in response to the coded image module 606 detecting the scan of the coded image 702. The notification 706 may include a request for the user of the client device 102 to display or dismiss the preview 704. In some example embodiments, the notification 706 may include an indication of how long the preview is available for viewing. For example, the indication may include a timer (e.g., 24:24:05 remaining, 1 day remaining, etc.), or an indication of how many views of the preview are remaining (e.g., 10 scans left before preview expires).

A user of the client device 102 may select to display the preview 704 through the notification 706, and in response, the display module 608 may cause display of the preview 704 at the client device 102. Alternatively, if the user selects to dismiss the preview through the notification 706, the display module 608 may not cause display of the preview 704.

Figure 7B:
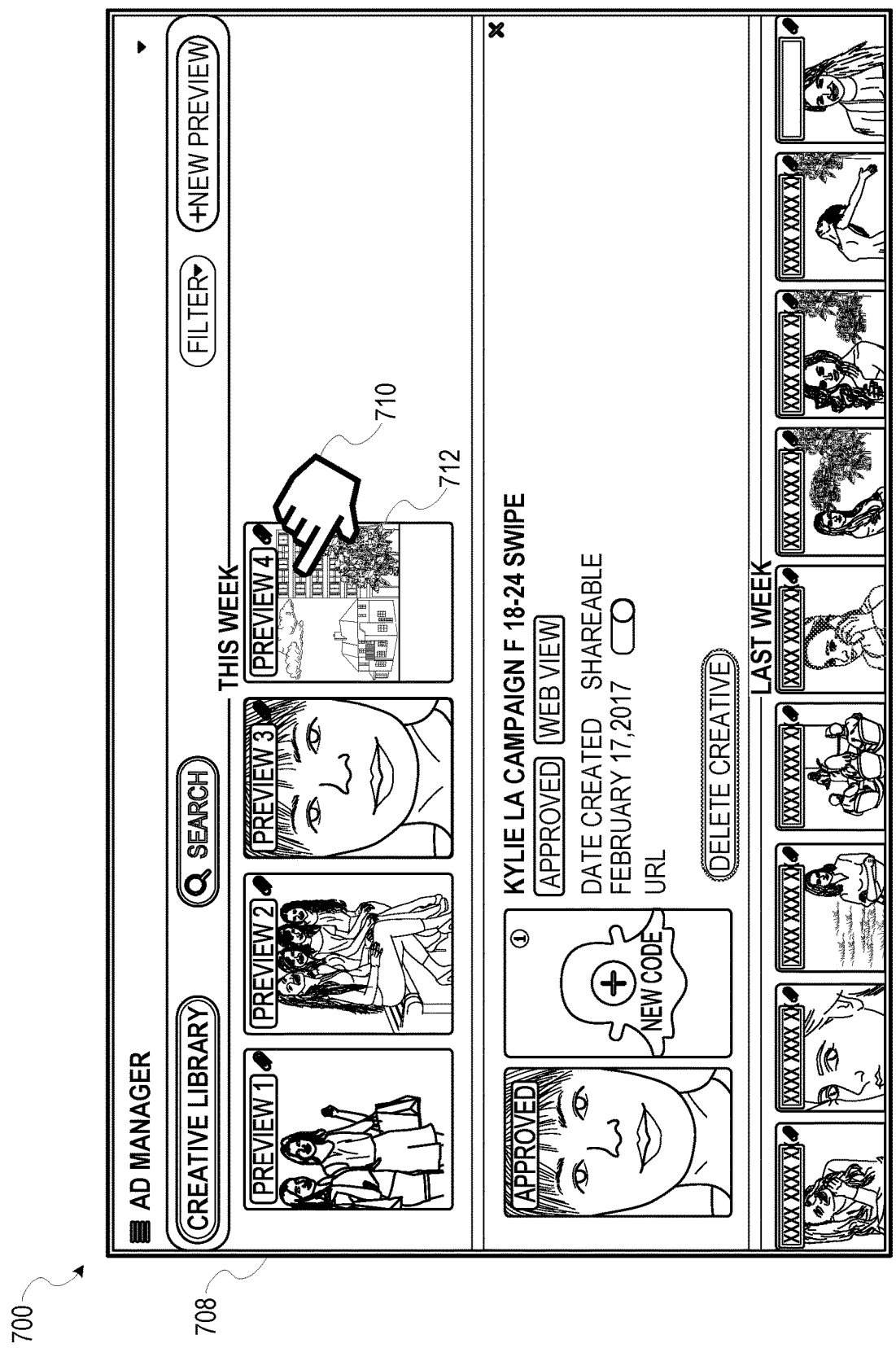
FIG. 7B includes a depiction of a preview library displayed at a client device, according to certain example embodiments.

FIG. 7B includes a graphical user interface 700 that includes a presentation of a preview library 708 displayed at a client device (e.g., client device 102), according to certain example embodiments. The preview library 708 is shown to include a set of previews of media items, such as preview 712. In some example embodiments, the preview module 604 may generate previews of media content (e.g., preview 712), and cause display of the previews within the preview library 708.

In some example embodiments, a user may select a preview (e.g., the preview 712) via a user input (e.g., via a cursor 710, or through a tactile input into a touch enabled device). In response, the media preview module 124 may retrieve and present to the user a coded image (e.g., coded image 702 of FIG. 7A), such that the user may distribute or share the coded image 702 with a group of reviewers. In further embodiments, the preview library 708 may itself be associated with a coded image (e.g., coded image 702), such that by scanning the coded image 702, the user may be presented with the preview library 708.

In some example embodiments, a user may manage the previews within the preview library 708 via one or more input fields in the preview library 708. For example, a user may disable a preview via one or more user inputs into the preview library 708. For example, the user may turn on and off the preview such that users scanning the associated coded image may not be presented with the preview.

Figure 8:
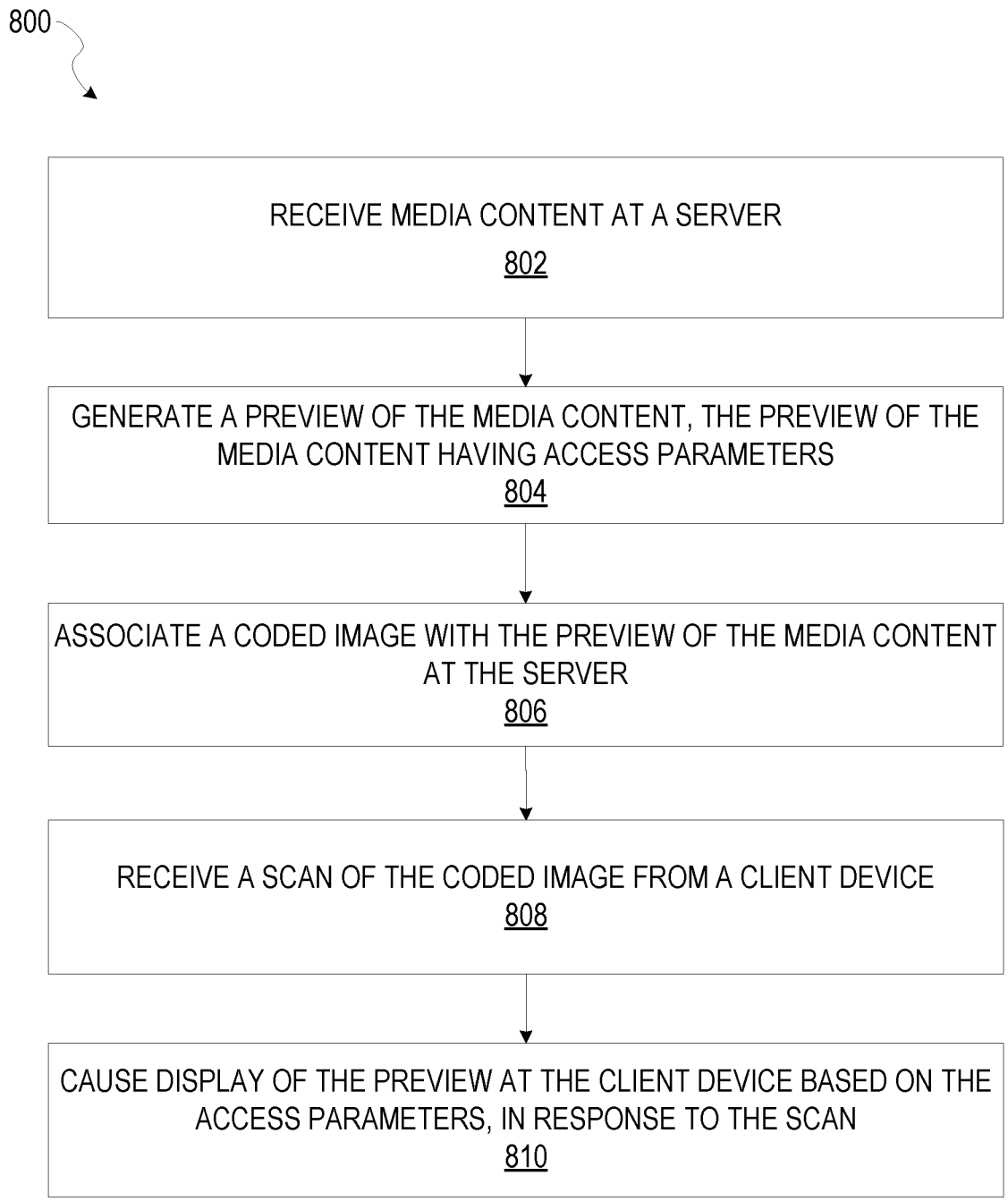
FIG. 8 is a flowchart illustrating a method displaying a preview of media content at a client device, according to certain example embodiments.

FIG. 8 is a flowchart illustrating a method 800 for displaying a preview of media content at a client device, according to certain example embodiments. Operations of the method 800 may be performed by the modules described above with respect to FIG. 6. As shown in FIG. 8, the method 800 includes one or more operations 802, 804, 806, 808, and 810.

At operation 802, the media module 602 receives media content at a server associated with the media preview system 124. For example, a client device 102 in communication with the media preview system 124 may submit media content that includes collections of text, image video and audio data, as described in FIG. 2. For example, the media content may include collections of content made available as a "story" for the duration of an event, or media overlays and filters.

At operation 804, the preview module 604 generates a preview of the media content, wherein the preview of the media content includes access parameters. In some example embodiments, to generate the preview of the media content, the preview module 604 alters the media content with a watermark. In further embodiments, the preview module 604 may change or remove geolocation criteria, or temporal criteria associated with the media content in generating the preview. For example, the media content may be configured to include geolocation criteria that requires viewers to be at a specific location in order to gain access to the media content, or similarly may only be viewed at specific time periods. The preview of the media content may remove these criteria in order for a reviewer to view the preview at their own time and place of choosing.

In some example embodiments, the access parameters assigned to the coded image may include access credentials such as user identifier, title, team name, and device identifier. The access parameters may also include a set of termination events, such as a time period in which the preview may be available through the coded image, or a maximum number of scans of the coded image before the preview becomes unavailable.

At operation 806, the coded image module 606 associated a coded image (e.g., coded image 702 of FIG. 7A) with the preview at a memory location of a database associated with the media preview system 124. The coded image may for example include a barcode, QR code, or other similar graphical icon, such that referencing the coded image causes the media preview system 124 to retrieve and present the associated preview.

In some example embodiments, the media preview system 124 may present the coded image associated with the preview to an administrator, or user, which created the media content in order for the user to distribute or otherwise share the coded image. For example, the media preview system 124 may cause the coded image to be printed (e.g., on paper, or on stickers or decals), or simply displayed in an email or other message. The user may then distribute the coded image physically or electronically.

At operation 808, the coded image module 606 detects a scan of the coded image by a client device. For example, a user may scan the coded image via an input component (e.g., a camera) of a client device 102. Upon scanning the coded image, the client device 102 may transmit a request to the media preview system 124 that includes coded image data from the coded image, as well as user data and client device data associated with the client device.

At operation 810, the display module 608 causes display of the preview at the client device 102 in response to detecting the scan of the coded image. In some example embodiments, the display module 608 may validate the requesting user based on the access parameters of the coded image and the user data and client device data associated with the client device.

Figure 9:
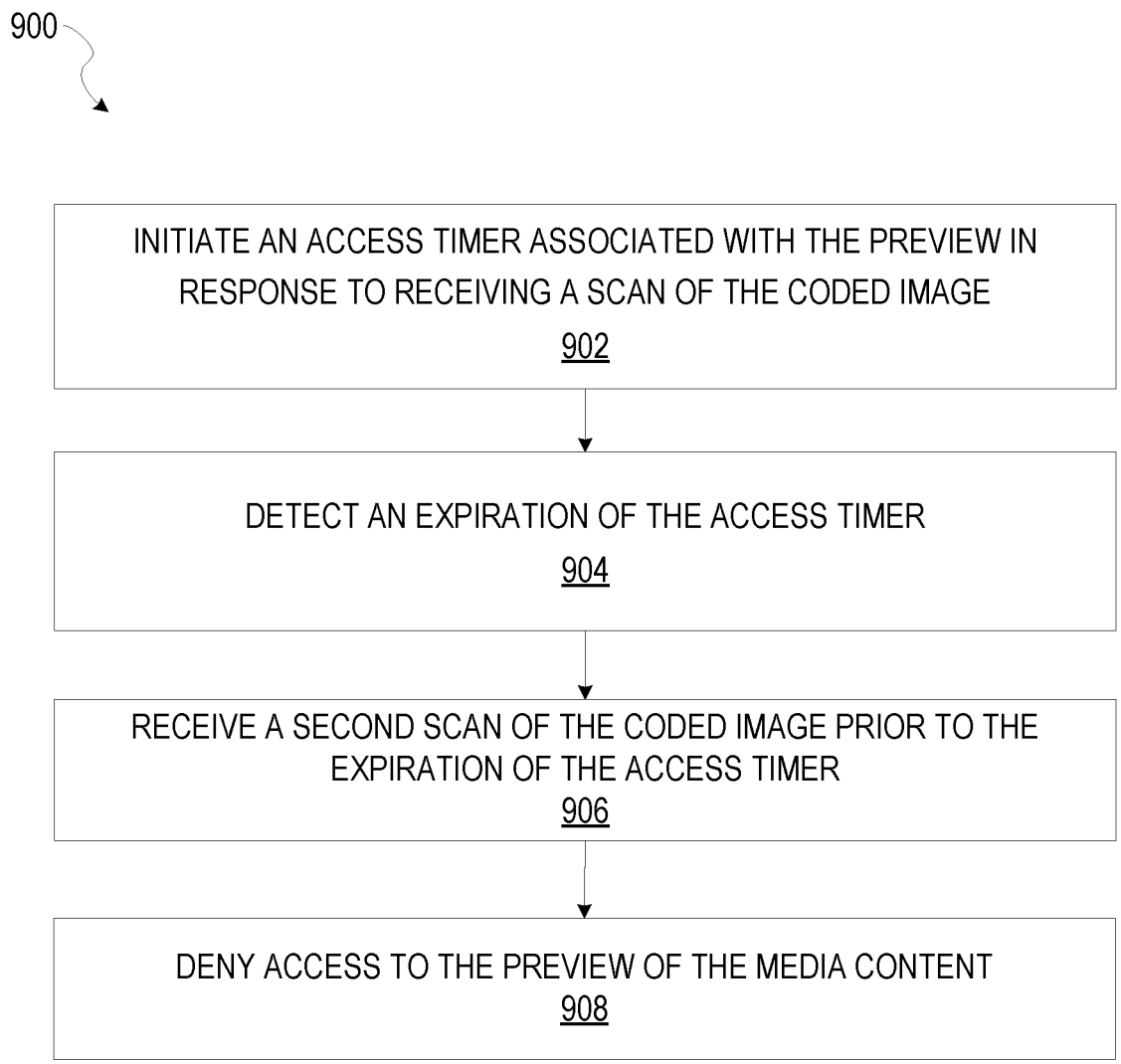
FIG. 9 is a flowchart illustrating a method for denying access to a preview of media content at a client device, according to certain example embodiments.

FIG. 9 is a flowchart illustrating a method 900 for denying access to a preview of media content at a client device, according to certain example embodiments. Operations of the method 900 may be performed by the modules described above with respect to FIG. 6. As shown in FIG. 9, the method 900 includes one or more operations 902, 904, 906 and 908. The method 900 may be performed as part (e.g., a precursor task, a subroutine, or a portion) of the method 800, according to some example embodiments.

At operation 902, the preview module 604 initiates an access timer associated with the preview in response to receiving a scan of the coded image (e.g., coded image 702 of FIG. 7A). The access parameters of the preview may include the access timer. The access timer may define a period of time in which the preview may be accessed via scanning the coded image. For example, the access timer may initiate at the time in which the coded image is first scanned by a device. The access timer may have an associated time limit, such as 24 hours, a week, etc. In some example embodiments, a user may configure the access parameters of the review, including the access timer, by providing a user input that species the time limit at the time in which the media content is provided to the media preview system 124. For example, a user may indicate that the preview is only to be available by scanning the coded image for a period of 24 hours from the first scan of the coded image.

At operation 904, the preview module 604 detects an expiration of the access timer. For example, the access timer may initiate in response to detecting a first scan of the coded image associated with the preview. The access timer may run for a period of time defined by a user. The preview module 604 may detect an expiration of the period of time (e.g., 24 hours).

At operation 906, the coded image module 606 detect a second scan of the coded image prior to the expiration of the access timer. In response to detecting the second scan of the coded image subsequent to the expiration of the access timer, at operation 908, the preview module 604 denies access to the preview of the media content. For example, the preview module 604 may cause the display module 608 to display an indication that the preview is no longer available for viewing.

Figure 10:
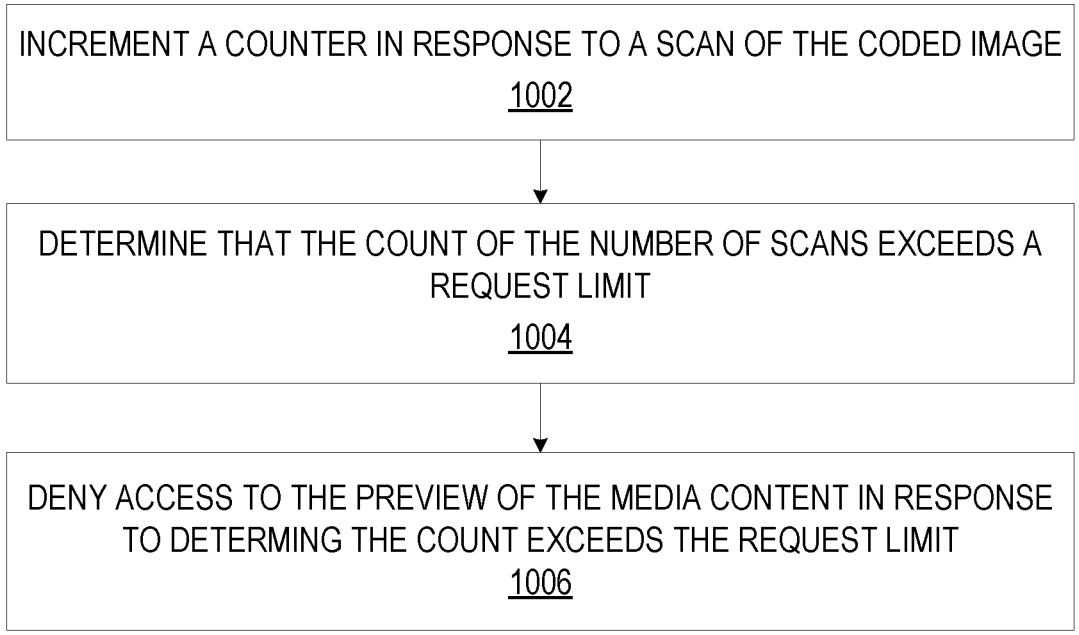
FIG. 10 is a flowchart illustrating a method for denying access to a preview of media content at a client device, according to certain example embodiments.

FIG. 10 is a flowchart illustrating a method 1000 for denying access to a preview of media content at a client device, according to certain example embodiments. Operations of the method 1000 may be performed by the modules described above with respect to FIG. 6. As shown in FIG. 10, the method 1000 includes one or more operations 1002, 1004, and 1006. The method 1000 may be performed as part (e.g., a precursor task, a subroutine, or a portion) of the method 800, according to some example embodiments.

At operation 1002, the preview module 604 increments a counter in response to detecting a scan of the coded image by a client device, as described at operation 808 of the method 800 as depicted in FIG. 8. For example, the access parameters of the preview may include a request limit, wherein the request limit defines a maximum number of times in which the preview may be retrieved by the media preview system 124 in response to detecting a scan of the associated coded image. For example, in response to detecting a scan of the coded image, the preview module 604 may increment a counter, wherein the counter indicates a count of the scans of the coded image. Upon determining that the count of the scans of the coded image exceeds a threshold defined by a request limit, the preview module 604 may deny access to the preview.

At operation 1004, the preview module 604 determines that the count of the number of scans of the coded image exceeds the request limit. For example, the request limit may indicate that the preview may only be accessed 50 times in response to a scan of the coded image. Upon determining that the count of the number of scans is equal to 50, at operation 1006, the preview module 604 denies access to the preview of the media content. For example, the display module 606 may cause display of a notification at a client device (e.g., a client device used to scan the coded image), wherein the notification includes an indication that the preview is no longer available.

Figure 11:
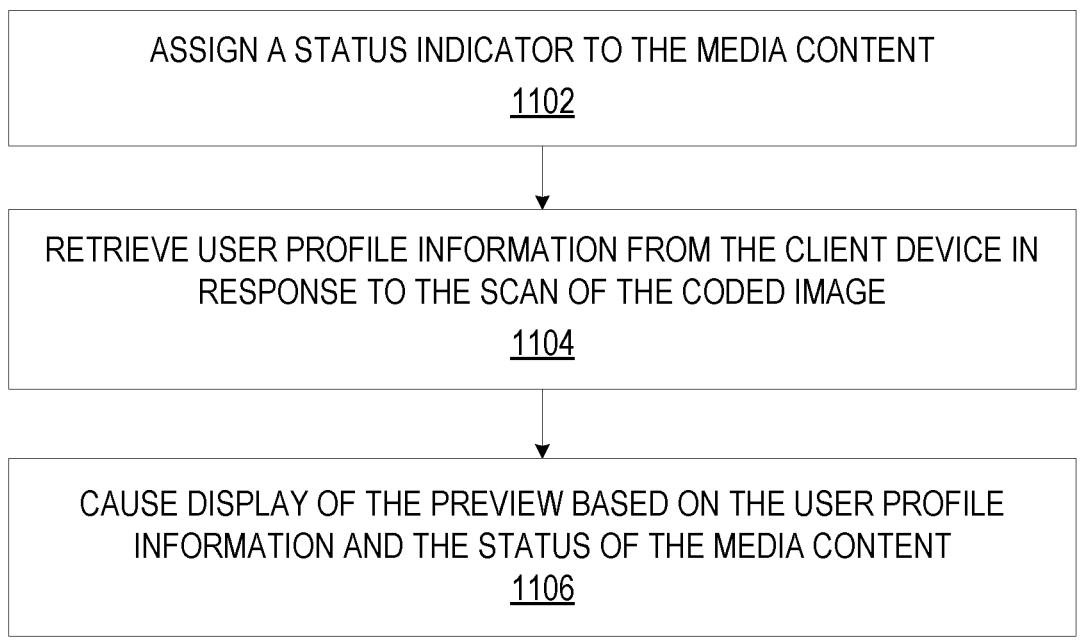
FIG. 11 is a flowchart illustrating a method for displaying a preview of media content at a client device, according to certain example embodiments.

FIG. 11 is a flowchart illustrating a method 1100 for displaying a preview of media content at a client device, according to certain example embodiments. Operations of the method 1100 may be performed by the modules described above with respect to FIG. 6. As shown in FIG. 11, the method 1100 includes one or more operations 1102, 1104, and 1106. The method 1100 may be performed as part (e.g., a precursor task, a subroutine, or a portion) of the method 800, according to some example embodiments.

At operation 1102, the media module 602 receives a user input to define a status of media content. For example, as described in FIG. 7B, a user may manage previews within a preview library (e.g., preview library 708) via one or more input fields. For example, the user may disable a preview via a user input into a GUI. For example, the user may change a status of a preview based on one or more selections. The status may indicate that a preview is shareable via a scan of a coded image, or that it is not shareable via a scan of the coded image.

In some example embodiments, a user may specify that the status of the preview is in one or multiple states (e.g., under review, approved, rejected). Each state among the one or more states may have associated access requirements. For example, the access requirements may include credential requirements such as user profile information including user identifier, title, team identifier, etc. In such embodiments, the status of the preview may therefore indicate what users can access the preview. Thus, a preview that is marked with a "review" status, may be available to a predefined population of users, based on specific user profile information, while the same preview marked as "rejected" may only be available to a subset of the population of users, based on their user profile information.

For example, by marking the preview as approved, the preview may be made available to any user which scans the coded image, while marking the preview as rejected may make the preview available to a small population of users, based on the user profile information of the small population of users (e.g., employment status, title, user identifier, etc.).

At operation 1104, the coded image module 606 retrieves user profile information from a client device (e.g., the client device which scanned the coded image), in response to detecting the scan of the coded image. Based on the user profile information and the status of the preview, at operation 1106 the display module 606 causes display of the preview at the client device.

Figure 12:
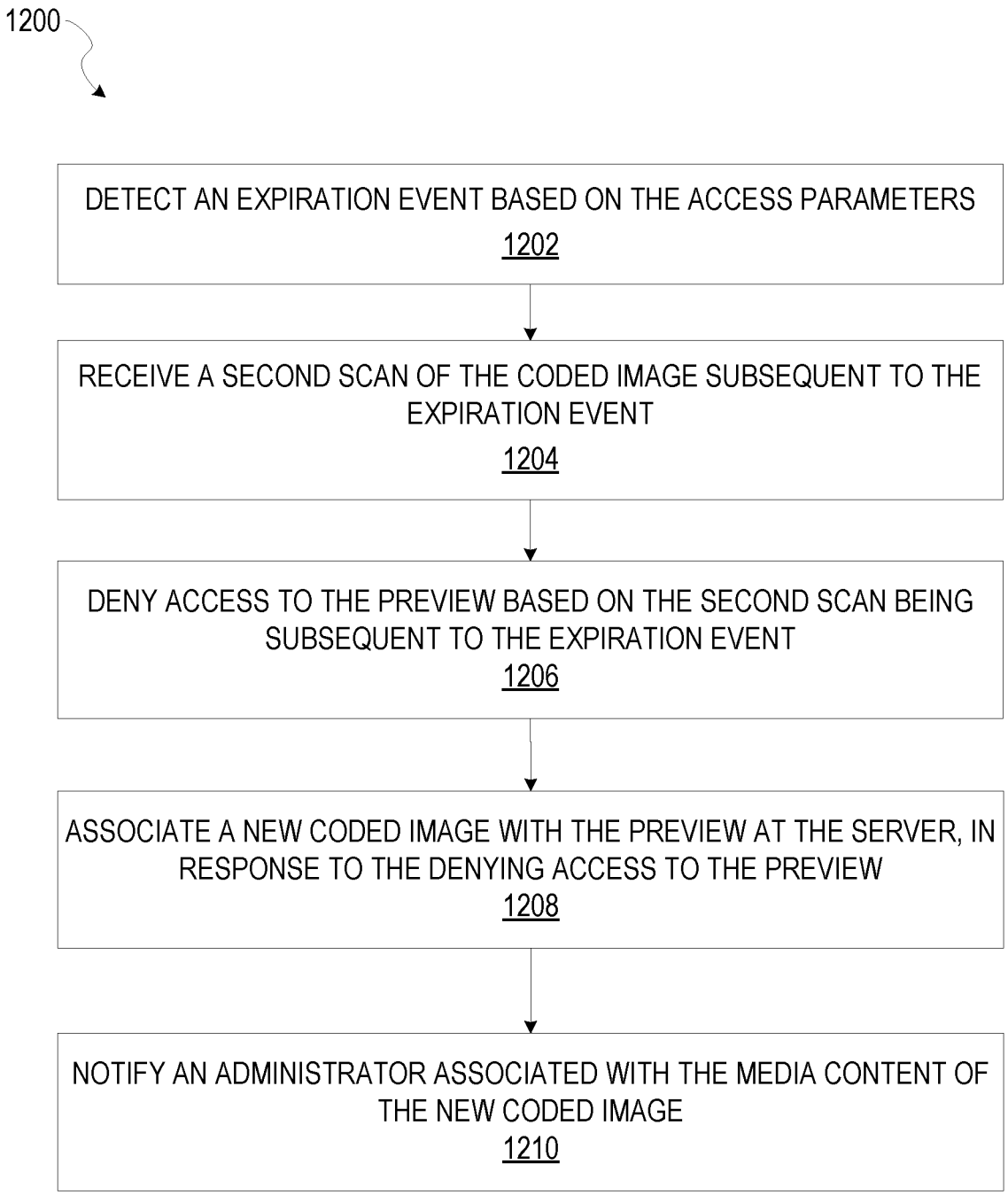
FIG. 12 is a flowchart illustrating a method for associating a new coded image with a preview of media content, according to certain example embodiments.

FIG. 12 is a flowchart illustrating a method 1200 for associating a new coded image with a preview of media content, according to certain example embodiments. Operations of the method 1200 may be performed by the modules described above with respect to FIG. 6. As shown in FIG. 12, the method 1200 includes one or more operations 1202, 1204, 1206, 1208, and 1210. The method 1200 may be performed as part (e.g., a precursor task, a subroutine, or a portion) of the method 800, according to some example embodiments.

At operation 1202, the preview module 604 detects an expiration event based on the access parameters. Expiration events may include detection of an expiration of a timer, or detection of a count of scans of a coded image exceeding a request limit, as described with respect to FIGS. 9 and 10.

At operation 1204, the coded image module 606 detects a scan of the coded image, subsequent to the expiration event. For example, the coded image module 606 may detect a scan of the coded image subsequent to the expiration of a timer, or subsequent to the count of the scans of the coded image exceeding the request limit.

At operation 1206, the preview module 604 denies access to the preview based on the scan of the coded image occurring subsequent to the detection of the expiration event. For example, the preview module 604 may cause the display module 608 to cause display of a notification at the client device, wherein the notification includes an indication that the preview may no longer be accessed.

At operation 1208, the coded image module 606 generates a new coded image, and associates the preview with the new coded image within a database associated with the media preview system 124, in response to the denial of the preview request.

At operation 1210, the coded image module 606 notifies a user (e.g., a user with administrative privileges) that the new coded image has been associated with the preview. The notification may include a presentation of the new coded image, such that the user may distribute or otherwise share the new coded image.

Software Architecture

Figure 13:
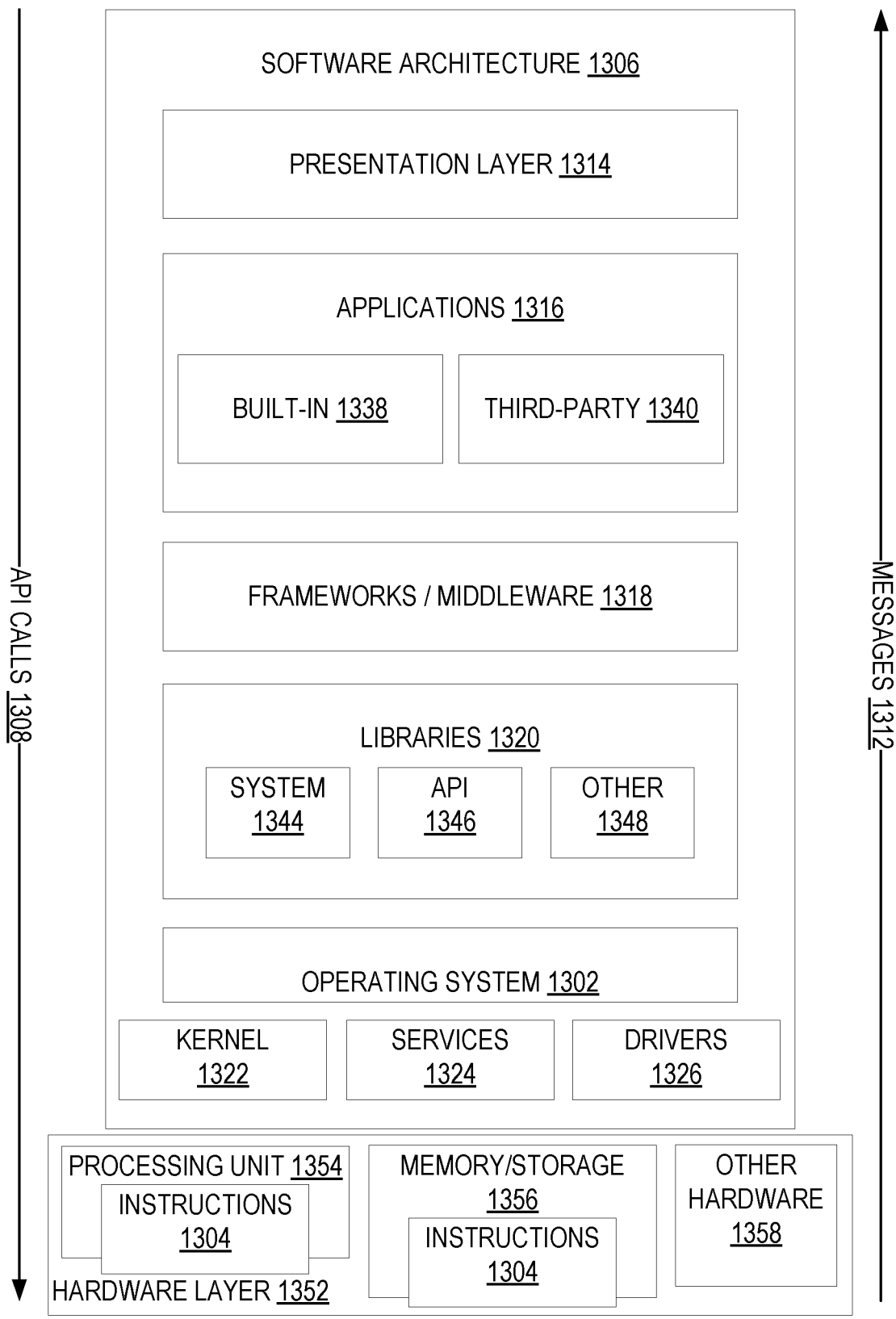
FIG. 13 is a block diagram illustrating a representative software architecture, which may be used in conjunction with various hardware architectures herein described and used to implement various embodiments.

FIG. 13 is a block diagram illustrating an example software architecture 1306, which may be used in conjunction with various hardware architectures herein described. FIG. 13 is a non-limiting example of a software architecture and it will be appreciated that many other architectures may be implemented to facilitate the functionality described herein. The software architecture 1306 may execute on hardware such as machine 1400 of FIG. 14 that includes, among other things, processors 1404, memory 1414, and I/O components 1418. A representative hardware layer 1352 is illustrated and can represent, for example, the machine 1300 of FIG. 13. The representative hardware layer 1352 includes a processing unit 1354 having associated executable instructions 1304. Executable instructions 1304 represent the executable instructions of the software architecture 1306, including implementation of the methods, components and so forth described herein. The hardware layer 1352 also includes memory and/or storage modules memory/storage 1356, which also have executable instructions 1304. The hardware layer 1352 may also comprise other hardware 1358.

In the example architecture of FIG. 13, the software architecture 1306 may be conceptualized as a stack of layers where each layer provides particular functionality. For example, the software architecture 1306 may include layers such as an operating system 1302, libraries 1320, applications 1316 and a presentation layer 1314. Operationally, the applications 1316 and/or other components within the layers may invoke application programming interface (API) API calls 1308 through the software stack and receive a response as in response to the API calls 1308. The layers illustrated are representative in nature and not all software architectures have all layers. For example, some mobile or special purpose operating systems may not provide a frameworks/middleware 1318, while others may provide such a layer. Other software architectures may include additional or different layers.

The operating system 1302 may manage hardware resources and provide common services. The operating system 1302 may include, for example, a kernel 1322, services 1324 and drivers 1326. The kernel 1322 may act as an abstraction layer between the hardware and the other software layers. For example, the kernel 1322 may be responsible for memory management, processor management (e.g., scheduling), component management, networking, security settings, and so on. The services 1324 may provide other common services for the other software layers. The drivers 1326 are responsible for controlling or interfacing with the underlying hardware. For instance, the drivers 1326 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1320 provide a common infrastructure that is used by the applications 1316 and/or other components and/or layers. The libraries 1320 provide functionality that allows other software components to perform tasks in an easier fashion than to interface directly with the underlying operating system 1302 functionality (e.g., kernel 1322, services 1324 and/or drivers 1326). The libraries 1320 may include system libraries 1344 (e.g., C standard library) that may provide functions such as memory allocation functions, string manipulation functions, mathematical functions, and the like. In addition, the libraries 1320 may include API libraries 1346 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1320 may also include a wide variety of other libraries 1348 to provide many other APIs to the applications 1316 and other software components/modules.

The frameworks/middleware 1318 (also sometimes referred to as middleware) provide a higher-level common infrastructure that may be used by the applications 1316 and/or other software components/modules. For example, the frameworks/middleware 1318 may provide various graphic user interface (GUI) functions, high-level resource management, high-level location services, and so forth. The frameworks/middleware 1318 may provide a broad spectrum of other APIs that may be utilized by the applications 1316 and/or other software components/modules, some of which may be specific to a particular operating system 1302 or platform.

The applications 1316 include built-in applications 1338 and/or third-party applications 1340. Examples of representative built-in applications 1338 may include, but are not limited to, a contacts application, a browser application, a book reader application, a location application, a media application, a messaging application, and/or a game application. Third-party applications 1340 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1340 may invoke the API calls 1308 provided by the mobile operating system (such as operating system 1302) to facilitate functionality described herein.

The applications 1316 may use built in operating system functions (e.g., kernel 1322, services 1324 and/or drivers 1326), libraries 1320, and frameworks/middleware 1318 to create user interfaces to interact with users of the system. Alternatively, or additionally, in some systems interactions with a user may occur through a presentation layer, such as presentation layer 1314. In these systems, the application/component "logic" can be separated from the aspects of the application/component that interact with a user.

Figure 14:
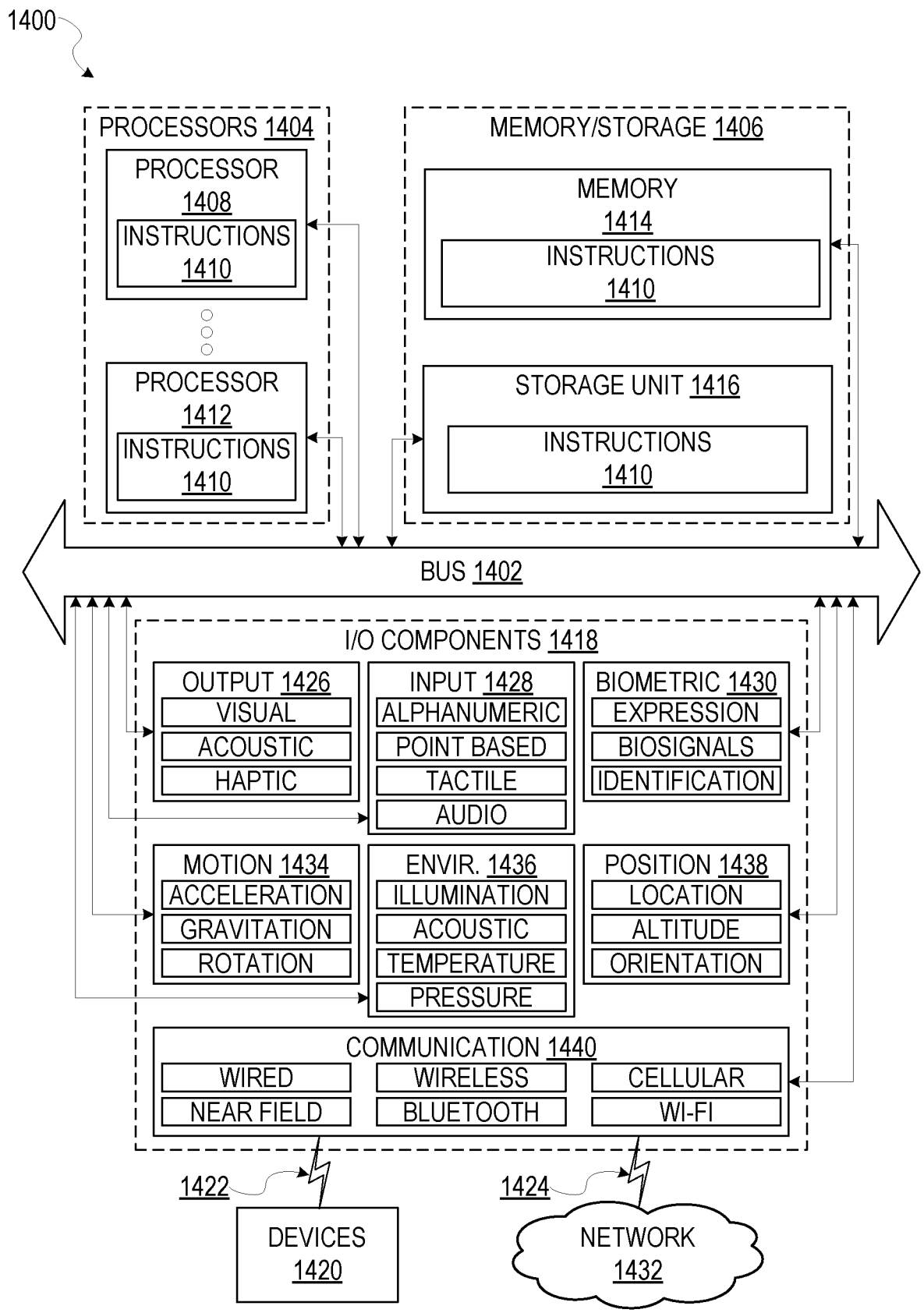
FIG. 14 is a block diagram illustrating components of a machine, according to some example embodiments, able to read instructions from a machine-readable medium (e.g., a machine-readable storage medium) and perform any one or more of the methodologies discussed herein.

FIG. 12 is a block diagram illustrating components of a machine 1400, according to some example embodiments, able to read instructions from a machine-readable medium (e.g., a machine-readable storage medium) and perform any one or more of the methodologies discussed herein. Specifically, FIG. 14 shows a diagrammatic representation of the machine 1400 in the example form of a computer system, within which instructions 1410 (e.g., software, a program, an application, an applet, an app, or other executable code) for causing the machine 1400 to perform any one or more of the methodologies discussed herein may be executed. As such, the instructions 1410 may be used to implement modules or components described herein. The instructions 1410 transform the general, non-programmed machine 1400 into a particular machine 1400 programmed to carry out the described and illustrated functions in the manner described. In alternative embodiments, the machine 1400 operates as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1410, sequentially or otherwise, that specify actions to be taken by machine 1400. Further, while only a single machine 1400 is illustrated, the term "machine" shall also be taken to include a collection of machines that individually or jointly execute the instructions 1410 to perform any one or more of the methodologies discussed herein.

The machine 1400 may include processors 1404, memory memory/storage 1406, and I/O components 1418, which may be configured to communicate with each other such as via a bus 1402. The memory/storage 1406 may include a memory 1414, such as a main memory, or other memory storage, and a storage unit 1416, both accessible to the processors 1404 such as via the bus 1402. The storage unit 1416 and memory 1414 store the instructions 1410 embodying any one or more of the methodologies or functions described herein. The instructions 1410 may also reside, completely or partially, within the memory 1414, within the storage unit 1416, within at least one of the processors 1404 (e.g., within the processor's cache memory), or any suitable combination thereof, during execution thereof by the machine 1400. Accordingly, the memory 1414, the storage unit 1416, and the memory of processors 1404 are examples of machine-readable media.

The I/O components 1418 may include a wide variety of components to receive input, provide output, produce output, transmit information, exchange information, capture measurements, and so on. The specific I/O components 1418 that are included in a particular machine 1400 will depend on the type of machine. For example, portable machines such as mobile phones will likely include a touch input device or other such input mechanisms, while a headless server machine will likely not include such a touch input device. It will be appreciated that the I/O components 1418 may include many other components that are not shown in FIG. 14. The I/O components 1418 are grouped according to functionality merely for simplifying the following discussion and the grouping is in no way limiting. In various example embodiments, the I/O components 1418 may include output components 1426 and input components 1428. The output components 1426 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1428 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1418 may include biometric components 1430, motion components 1434, environmental environment components 1436, or position components 1438 among a wide array of other components. For example, the biometric components 1430 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1434 may include acceleration sensor components (e.g., accelerometer), gravitation sensor components, rotation sensor components (e.g., gyroscope), and so forth. The environment components 1436 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1438 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1418 may include communication components 1440 operable to couple the machine 1400 to a network 1432 or devices 1420 via coupling 1422 and coupling 1424 respectively. For example, the communication components 1440 may include a network interface component or other suitable device to interface with the network 1432. In further examples, communication components 1440 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1420 may be another machine or any of a wide variety of peripheral devices (e.g., a peripheral device coupled via a Universal Serial Bus (USB)).

Moreover, the communication components 1440 may detect identifiers or include components operable to detect identifiers. For example, the communication components 1440 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1440, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EMPHEMERAL MESSAGE" in this context refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

"LIFT" in this context is a measure of the performance of a targeted model at predicting or classifying cases as having an enhanced response (with respect to a population as a whole), measured against a random choice targeting model.

What is claimed is:

1. A media preview system comprising:
a memory; and
at least one hardware processor coupled to the memory and comprising instructions that causes the media preview system to perform operations comprising:
receiving, by a remote server, media content from a first client device associated with an entity;
generating, by the remote server, a preview of the media content, the preview of the media content comprising a set of access parameters that includes a threshold of a request limit and geolocation criteria;
generating, by the remote server, a coded image that comprises a QR code that integrates a display of an entity logo associated with the entity as a machine-readable finder pattern within the QR code;
associating, by the remote server, the coded image with the preview of the media content at a database;
causing display of the coded image on a shareable means by the remote server, the shareable means being accessible by a second client device;
generating, by the remote server, a most recent preview of the media content based on changes to the media content and the preview of the media content received, from the first client device;
associating, by the remote server, the coded image with the most recent preview of the media content at the database;
receiving, from the second client device, a request to access the most recent preview of the media content and a geolocation of the second client device, the request and the geolocation being generated responsive to a scan of the coded image displayed on the shareable means by the second client device;
incrementing, by the remote server, a counter associated with the most recent preview of the media content responsive to the request that includes the scan of the coded image, the counter indicating a number of requests to access the most recent preview received from one or more client devices;
determining, by the remote server, that the number of requests to access the most recent preview is below the threshold of the request limit and the geolocation of the second client device meets the geolocation criteria;

transmitting, by the remote server, data of a notification to the second client device responsive to the receiving the request that comprises the scan of the coded image and the determining that the number of requests to access the most recent preview is below the threshold of the request limit and the geolocation of the second client device meets the geolocation criteria, the data of the notification causing display of the notification on a graphical user interface of the second client device, the notification including a request for a user of the second client device to display or dismiss the most recent preview of the media content;

receiving, from the second client device, a request to display the most recent preview of the media content, the request being generated responsive to an input of the user on the second client device that selects to display the most recent preview of the media content; and transmitting, by the remote server, data comprising the most recent preview of the media content to the second client device responsive to the input that selects to display the most recent preview of the media content in the notification, the data related to the most recent preview of the media content causing display of a presentation of the most recent preview at the graphical user interface of the second client device.

2. The system of claim 1, wherein the generating the preview of the media content includes applying a digital watermark to the media content.

3. The system of claim 1, wherein the preview corresponds with one or more access parameters, the scan of the coded image is a first scan, and further comprising:
   detecting an expiration of the preview based on the one or more access parameters;
   receiving a second scan of the coded image after the expiration of the preview; and
   denying access to the preview of the media content.

4. The system of claim 3, wherein the one or more access parameters define display criteria of the preview based on user profile information, and further comprising:
   assigning a status indicator to the media content, the status indicator indicating a state of the media content;
   retrieving user profile information from the second client device in response to the receiving the request; and
   causing display of the preview at the second client device based on the user profile information and the state of the media content.

5. The system of claim 3, wherein the scan of the coded image is a first scan, and further comprising:
   detecting an expiration event based on the access parameters;
   receiving a second scan of the coded image subsequent to the expiration event;
   denying access to the preview based on the second scan being subsequent to the expiration event;
   associating a new coded image with the preview in response to the denying access to the preview; and
   notifying an administrator associated with the media content of the new coded image.

6. The system of claim 3, wherein the access parameters include a request limit, and further comprising:
   incrementing a counter responsive to the request;
   determining that a count indicated by the counter exceeds is below the request limit; and
   causing display of the notification at the second client device based on the count indicated by the counter being below the request limit.

7. The system of claim 1, wherein the media content is a first media content, the preview is a first preview, and further comprising:
   receiving second media content at the system;
   generating a second preview of the second media content;
   associating the coded image with the second preview of the second media content;
   receiving the scan of the coded image from the second client device; and
   causing display of a preview library at the second client device in response to the receiving the scan, the preview library including presentations of the first preview and the second preview.

8. A method performed by a system comprising a first client device, a second client device, and a remote server for controlling sharing of preview of media content, the method comprising:
   receiving, by the remote server, media content from the first client device associated with an entity;
   generating, by the remote server, a preview of the media content, the preview of the media content comprising a set of access parameters that includes a threshold of a request limit and geolocation criteria;
   generating, by the remote server, a coded image that comprises a QR code that integrates a display of an entity logo associated with the entity as a machine-readable finder pattern within the QR code;
   associating, by the remote server, the coded image with the preview of the media content at a database;
   causing display of the coded image on a shareable means by the remote server, the shareable means being accessible by the second client device;
   generating, by the remote server, a most recent preview of the media content based on changes to the media content and the preview of the media content received, from the first client device;
   associating, by the remote server, the coded image with the most recent preview of the media content at the database;
   receiving, from the second client device, a request to access the most recent preview of the media content and a geolocation of the second client device, the request and the geolocation being generated responsive to a scan of the coded image displayed on the shareable means by the second client device;
   incrementing, by the remote server, a counter associated with the most recent preview of the media content responsive to the request that includes the scan of the coded image, the counter indicating a number of requests to access the most recent preview received from one or more client devices;
   determining, by the remote server, that the number of requests to access the most recent preview is below the threshold of the request limit and the geolocation of the second client device meets the geolocation criteria;
   transmitting, by the remote server, data of a notification to the second client device responsive to the receiving the request that comprises the scan of the coded image and the determining that the number of requests to access the most recent preview is below the threshold of the request limit and the geolocation of the second client device meets the geolocation criteria, the data of the notification causing display of the notification on a graphical user interface of the second client device, the notification including a request for a user of the second client device to display or dismiss the most recent preview of the media content;

receiving, from the second client device, a request to display the most recent preview of the media content, the request being generated responsive to an input of the user on the second client device that selects to display the most recent preview of the media content; and transmitting, by the remote server, data comprising the most recent adjusted preview of the media content to the second client device responsive to the input that selects to display the most recent preview of the media content in the notification, the data related to the most recent preview of the media content causing display of a presentation of the most recent preview at the graphical user interface of the second client device.

9. The method of claim 8, wherein the generating the preview of the media content includes applying a digital watermark to the media content.

10. The method of claim 8, wherein the preview corresponds with one or more access parameters, the scan of the coded image is a first scan, and further comprising:
 detecting an expiration of the preview based on the one or more access parameters;
 receiving a second scan of the coded image after the expiration of the preview; and
 denying access to the preview of the media content.

11. The method of claim 10, wherein the one or more access parameters define display criteria of the preview based on user profile information, and further comprising:
 assigning a status indicator to the media content, the status indicator indicating a state of the media content;
 retrieving user profile information from the second client device in response to the receiving the request; and
 causing display of the preview at the second client device based on the user profile information and the state of the media content.

12. The method of claim 10, wherein the scan of the coded image is a first scan, and further comprising:
 detecting an expiration event based on the access parameters;
 receiving a second scan of the coded image subsequent to the expiration event;
 denying access to the preview based on the second scan being subsequent to the expiration event;
 associating a new coded image with the preview in response to the denying access to the preview; and
 notifying an administrator associated with the media content of the new coded image.

13. The method of claim 10, wherein the access parameters include a request limit, and further comprising:
 incrementing a counter responsive to the request;
 determining that a count indicated by the counter exceeds is below the request limit; and
 causing display of the notification at the client device based on the count indicated by the counter being below the request limit.

14. The method of claim 8, wherein the media content is a first media content, the preview is a first preview, and further comprising:
 receiving second media content at the system;
 generating a second preview of the second media content;
 associating the coded image with the second preview of the second media content;
 receiving the scan of the coded image from the client device; and causing display of a preview library at the client device in response to the receiving the scan, the preview library including presentations of the first preview and the second preview.

15. A non-transitory machine-readable storage medium comprising instructions for controlling a sharing of preview of media content from a first client device to a second client device via a remote server of a media preview system that, when executed by one or more processors of a machine, cause the machine to perform operations comprising:
 receiving, by the remote server, media content from the first client device associated with an entity;
 generating, by the remote server, a preview of the media content, the preview of the media content comprising a set of access parameters that includes a threshold of a request limit and geolocation criteria;
 generating, by the remote server, a coded image that comprises a QR code that integrates a display of an entity logo associated with the entity as a machine-readable finder pattern within the QR code;
 associating, by the remote server, the coded image with the preview of the media content at a database;
 causing display of the coded image on a shareable means by the remote server, the shareable means being accessible by the second client device;
 generating, by the remote server, a most recent preview of the media content based on changes to the media content and the preview of the media content received, from the first client device;
 associating, by the remote server, the coded image with the most recent preview of the media content at the database;
 receiving, from the second client device, a request to access the most recent preview of the media content and a geolocation of the second client device, the request and the geolocation being generated responsive to a scan of the coded image displayed on the shareable means by the second client device;
 incrementing, by the remote server, a counter associated with the most recent preview of the media content responsive to the request that includes the scan of the coded image, the counter indicating a number of requests to access the most recent preview received from one or more client devices;
 determining, by the remote server, that the number of requests to access the most recent preview is below the threshold of the request limit and the geolocation of the second client device meets the geolocation criteria;
 transmitting, by the remote server, data of a notification to the second client device responsive to the receiving the request that comprises the scan of the coded image and the determining that the number of requests to access the most recent preview is below the threshold of the request limit and the geolocation of the second client device meets the geolocation criteria, the data of the notification causing display of the notification on a graphical user interface of the second client device, the notification including a request for a user of the second client device to display or dismiss the most recent preview of the media content;
 receiving, from the second client device, a request to display the most recent preview of the media content, the request being generated responsive to an input of the user on the second client device that selects to display the most recent preview of the media content; and transmitting, by the remote server, data comprising the most recent preview of the media content to the second client device responsive to the input that selects to display the most recent preview of the media content in the notification, the data related to the most recent preview of the media content causing display of a presentation of the most recent preview at the graphical user interface of the second client device.

16. The non-transitory machine-readable storage medium of claim 15, wherein the generating the preview of the media content includes applying a digital watermark to the media content.

17. The non-transitory machine-readable storage medium of claim 15, wherein the preview corresponds with one or more access parameters, the scan of the coded image is a first scan, and further comprising:
  detecting an expiration of the preview based on the one or more access parameters;
  receiving a second scan of the coded image after the expiration of the preview; and
  denying access to the preview of the media content.

18. The non-transitory machine-readable storage medium of claim 17, wherein the one or more access parameters define display criteria of the preview based on user profile information, and further comprising:
  assigning a status indicator to the media content, the status indicator indicating a state of the media content;
  retrieving user profile information from the client device in response to the receiving the request; and
  causing display of the preview at the client device based on the user profile information and the state of the media content.

19. The non-transitory machine-readable storage medium of claim 17, wherein the scan of the coded image is a first scan, and further comprising:
  detecting an expiration event based on the access parameters;
  receiving a second scan of the coded image subsequent to the expiration event;
  denying access to the preview based on the second scan being subsequent to the expiration event;
  associating a new coded image with the preview in response to the denying access to the preview; and
  notifying an administrator associated with the media content of the new coded image.

20. The non-transitory machine-readable storage medium of claim 17, wherein the access parameters include a request limit, and further comprising:
  incrementing a counter responsive to the request;
  determining that a count indicated by the counter exceeds is below the request limit; and
  causing display of the notification at the client device based on the count indicated by the counter being below the request limit.

* * * * *